June 16, 1931.  T. H. THOMAS  1,810,541
BRAKE RELEASE DEVICE
Filed Aug. 10, 1929
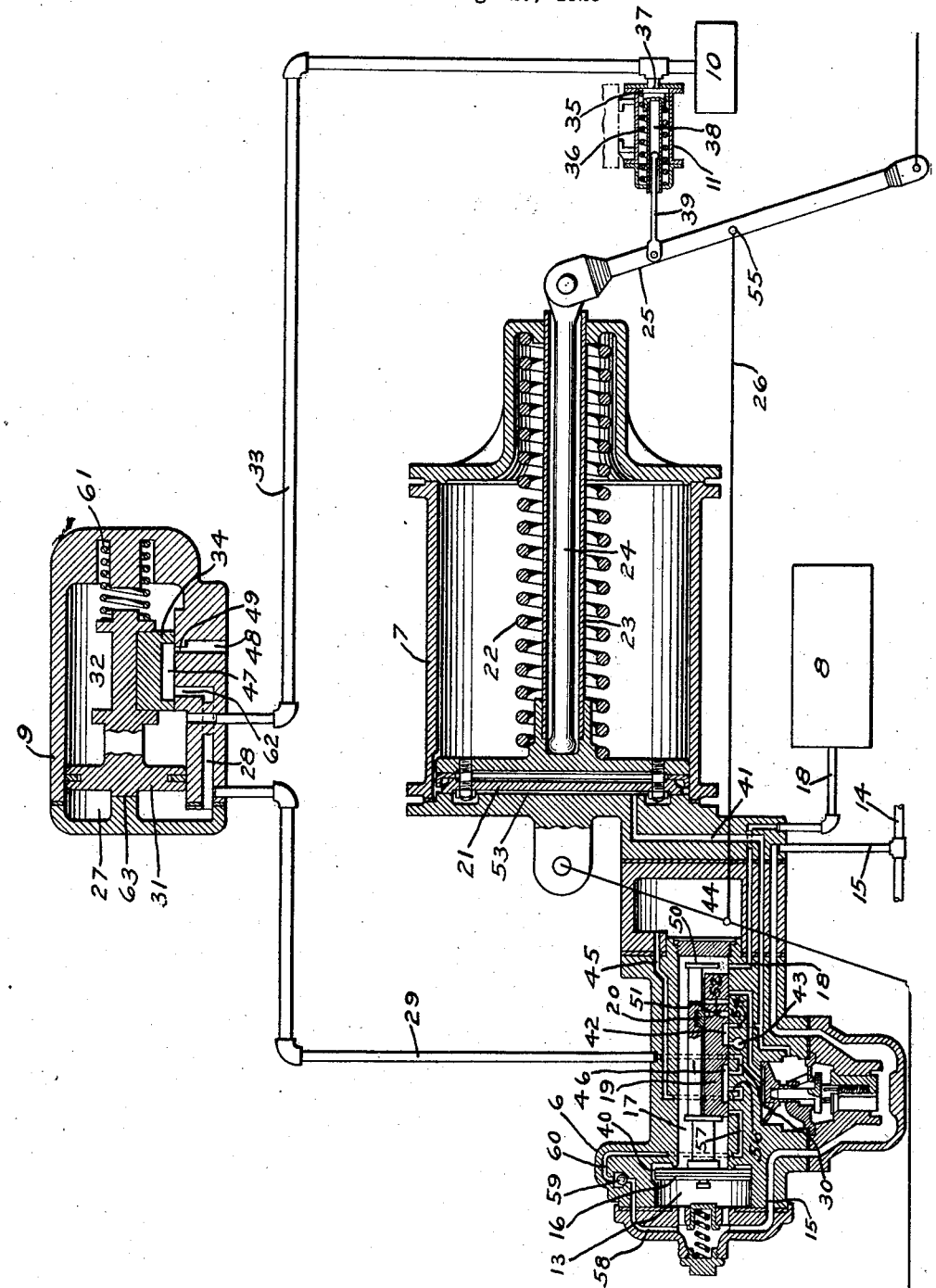
INVENTOR
THOMAS H. THOMAS DECEASED
MABEL M. THOMAS EXECUTRIX
BY
Wm. A. Cady
ATTORNEY Patented June 16, 1931

1,810,541

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE RELEASE DEVICE

Application filed August 10, 1929. Serial No. 384,826.

This invention relates to fluid pressure brakes and more particularly to a release device for the brake rigging.

Heretofore, in some cases, it has been customary to provide a spring for ensuring that the brake shoes on a car are pulled away from the car wheels when the brakes are released, so as to prevent the brake shoes dragging. When the brakes are applied, however, the pressure of this spring has to be overcome. Consequently, a portion of the power applied to the brake cylinder for operating the brakes, is utilized to overcome the pressure of the brake rigging release spring.

An object of the present invention is to provide means for assisting in effecting the movement of the brake rigging to release position.

Another object of the invention is to provide a brake rigging release device which is controlled by the triple valve device of fluid pressure brake equipment.

Another object of the invention is to provide a brake rigging release device in which the quick service exhaust pressure is utilized to release the brake rigging.

Another object of the invention is to provide means controlled by the triple valve device of fluid pressure brake apparatus for positively releasing the brake rigging when the brake apparatus is released.

Another object of the invention is to provide a brake release device of the character mentioned which is simple in construction and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic view, mostly in section, of a brake release device embodying the invention.

Referring to the drawing, the equipment may comprise a triple valve device 6, brake cylinder 7, auxiliary reservoir 8, release valve device 9, release reservoir 10, and release cylinder 11.

The triple valve device may comprise a casing having a piston chamber 13 connected to the usual brake pipe 14 by a passage and pipe 15 and containing a piston 16 and having a valve chamber 17, connected by a passage and pipe 18 to the auxiliary reservoir 8 and containing a main slide valve 19 and an auxiliary slide valve 20 adapted to be operated by piston 16.

Mounted in the brake cylinder 7 is a piston 21 which is subject on one side to the pressure of a spring 22. Projecting from the spring side of the piston 21 is a hollow rod 23, in which is a push rod 24. The push rod 24 is not connected to the hollow rod 23. However, the outer end of the push rod is attached to the brake lever 25. This allows the brakes to be applied by hand without moving the piston, but a pneumatic application forces out both hollow piston rod 23 and push rod 24. The lever 25 is connected to the usual foundation brake rigging, indicated in the present instance, at 26.

The release valve device 9 may comprise a casing having a piston chamber 27 connected to the seat of the main slide valve 19 of the triple valve device 6 by a passage 28, pipe 29, and passage 30 and containing a piston 31 and having a valve chamber 32 connected to the release reservoir 10 by a passage and pipe 33 and containing a slide valve 34 adapted to be operated by piston 31. Passage 28 also leads to the seat of the slide valve 34.

The release cylinder 11 is provided with a piston 35 which is subject on one side to the pressure of a spring 36, chamber 37 on the opposite side of said piston being connected to the pipe 33. Projecting from the spring side of the piston 35, is a hollow rod 38 in which is a push rod 39. The push rod 39 is mounted in the hollow piston rod 38 in a manner similar to that in which the brake cylinder push rod 24 is mounted in the piston rod 23, and the outer end of the push rod 39 is attached to the brake lever 25. From the drawing it will be noted that the relation of the parts is such that when the piston 21 of the brake cylinder 7 is in release position, and the brakes are released, the push rod 24 is disposed inwardly of the piston rod 23 while the push rod 39 will be disposed outwardly of the piston rod 38.

In operation, when the piston 16 of the triple valve device 6 is in release position, as shown in the drawing, the valve chamber 17 is charged from the brake pipe 14 in the usual manner by way of the usual feed groove 40, around piston 16.

The auxiliary reservoir 8 is charged from the valve chamber 17 through passage and pipe 18.

With the apparatus thus charged with fluid under pressure from the brake pipe 14, chamber 53 of the brake cylinder 7 is at atmospheric pressure, due to the connection through passage 41, port 54, port 42 in the main slide valve 19, and atmospheric passage 43.

Quick service bulb 44 of the triple valve device 6, is also at atmospheric pressure, due to the connection through passage 45, port 56, port 46 in the main slide valve 19, passage 30, pipe 29, passage 28 in the release valve device 9, port 47 in the slide valve 34, and atmospheric passage 48 having a restriction or choke 49.

After the apparatus is charged with fluid under pressure from the brake pipe 14, in the manner described, if it is desired to effect an application of the brakes, the brake pipe pressure is reduced in the usual manner, and consequently the pressure in piston chamber 13 is reduced to the same extent.

As the pressure of the fluid in the valve chamber 17 will then exceed the pressure of the fluid in piston chamber 13, piston 16 will be moved toward the left and communication from piston chamber 13 to the valve chamber 17 through the feed groove 40 will be cut off.

The movement of the piston 16 toward the left causes a corresponding movement of the auxiliary slide valve 20, while the main slide valve 19 remains stationary until the piston 16 has moved a predetermined amount and a shoulder 50 on the piston stem engages the main slide valve 19 and the latter will then be moved to application position.

The piston chamber 53 of the brake cylinder, being open to the atmosphere when the trpile valve device 6 is in release position, will be shut off from this connection when the port 54 is lapped by the main slide valve 19 when the latter is moved by piston 16.

The initial movement of the piston 16 causes the auxiliary slide valve 20 to uncover a port 51 in the main slide valve 19, said port having a restriction or choke 52 therein.

When the main slide valve 19 is moved by the piston 16 to application position, port 51 registers with port 54, thereby establishing communication from the valve chamber 17 to the chamber 53 of the brake cylinder 7.

Fluid under pressure then flows from the auxiliary reservoir 8, through pipe and passage 18 to the valve chamber 17, and from thence through ports 52 and 54 and passage 41 to the piston chamber 53 of the brake cylinder, forcing the piston 21 outward against the pressure of spring 22.

The outward movement of piston 21 causes a similar movement of the push rod 24, and the brake lever 25 is operated about its fulcrum 55, thereby moving the push rod 39 inward of the hollow rod 38, toward piston 35.

In service position the valve cavity 46 of the main slide valve 19 of the triple valve device connects ports 56 and 57. Fluid under pressure then flows from the piston chamber 13 and the brake pipe 14 to the quick service bulb 44, through passage 58, past ball check valve 59, passage 60, port 57, valve cavity 46, port 56, and passage 45, so that fluid under pressure is vented from the brake pipe 14 to the quick service bulb 44.

In this way a local reduction of brake pipe pressure is produced, thereby causing the usual quick service action to be propagated serially throughout the train.

If the brake pipe pressure should be reduced in making further reductions in brake pipe pressure to a degree less than that in the quick service bulb 44, ball check valve 59 will prevent the back flow of fluid from the quick service bulb 44 to the piston chamber 13.

When the brake pipe pressure is increased in the usual manner, to effect the release of the brakes, this action causes the piston 16 and slide valves 19 and 20 to move back to release position, in which the fluid under pressure in the brake cylinder is permitted to flow to the atmosphere through the passage 43, and fluid from the brake pipe 14 is permitted to flow to the auxiliary reservoir 8 in the manner hereinbefore described, which is thus recharged.

When the main slide valve 19 is returned to release position, as shown in the drawing, communication is established between the quick service bulb 44 and the piston chamber 27 of the release valve device 9, through passage 45, port 56, valve cavity 46, passage 30, pipe 29, and passage 28.

Fluid under pressure is thus permitted to flow from the quick service bulb 44 to the chamber 27 and also to the atmosphere through restricted passage 48. However, a sufficient pressure is created in chamber 27 to cause the piston 31 to move toward the right against the pressure of spring 61, and this piston movement causes the slide valve 34 to lap the exhaust passage 48 and uncover port 62.

In this way communication is established from piston chamber 27 to valve chamber 32, and from the latter, through pipe 33 to release reservoir 10 and piston chamber 37, and fluid pressure will consequently be built up against piston 35, forcing said piston outward of the release cylinder 11.

The outward movement of the piston 35 causes a similar movement of the push rod 39 and the brake lever 25 is therefore returned to its normal release position. This action forces the push rod 24 inwardly of the hollow rod 23, toward the brake cylinder piston 21.

When the fluid pressure in the release reservoir 10 and in the valve chamber 32, acting on one side of piston 31, substantially equalizes with the pressure in quick service bulb 44, acting in chamber 27 on the opposite side of said piston, spring 61 will force piston 31 toward the left until the piston travel is arrested by stop 63.

This movement of the piston 31 causes a corresponding movement of the slide valve 34, and the latter will be returned to its normal position in which passages 28 and 48 will be connected by the valve cavity 47, thereby establishing the communication through which the quick service bulb 44 and piston chamber 27 are vented to the atmosphere, as has been heretofore described.

When the pistons 31 and 35 return to their respective release positions after the brakes have been released, fluid under pressure in reservoir 10 will gradually leak past the pistons and escape to the atmosphere, this blow down of the pressure in reservoir 10, occurring between applications of the brakes.

From the foregoing it will be noted that there is provided means by which the brake rigging will be positively returned to normal release position when the brakes are released after an application.

While one illustrative embodiment of the invention has been described in detail, it is not intended to limit its scope to that embodiment or otherwise than by the terms of the appended claims.

Having now described the invention, what is claimed as new and desired to be secured by Letters Patent, is:

1. The combination with a triple valve device having a quick service bulb, a brake lever and a brake cylinder controlled by said triple valve device and adapted to operate said lever only in one direction, of means actuated by fluid pressure from said quick service bulb for operating said lever in the opposite direction.

2. The combination with a brake lever, a brake cylinder adapted to operate said lever only in one direction, and a triple valve device for controlling the operation of said brake cylinder, of means for operating said lever in the opposite direction and a valve device controlled by said triple valve device for controlling the operation of said means.

3. The combination with a brake lever, a brake cylinder for operating said lever only in one direction, and a triple valve device for controlling the operation of said brake cylinder, said triple valve device having a quick service bulb adapted to be charged with fluid under pressure when said brake cylinder is operated, of means for operating said lever in the opposite direction, and a valve device adapted to be operated when said triple valve device is operated to release the brakes, for supplying fluid under pressure to said means from the quick service bulb.

4. In a fluid pressure brake, the combination with a brake cylinder containing a brake cylinder piston, of means for controlling the supply and release of fluid under pressure to and from the brake cylinder, mechanism operated by fluid under pressure for assisting the release movement, and means operated in releasing the brakes for supplying fluid under pressure to said mechanism.

5. In a fluid pressure brake, the combination with a brake cylinder containing a brake cylinder piston and a lever operatively connected to said piston, of means for supplying fluid under pressure to said piston to operate said lever in applying the brakes, and means operated by fluid under pressure supplied in releasing fluid from the brake cylinder for assisting the release movement of said lever.

6. In a fluid pressure brake, the combination with a brake pipe, of a valve device operated upon a reduction in brake pipe pressure for effecting an application of the brakes and having a chamber into which fluid under pressure is vented from the brake pipe in applying the brakes, and means operated by fluid under pressure supplied from said chamber for assisting the release of the brakes.

7. In a fluid pressure brake, the combination with a brake pipe, of a valve device operated upon a reduction in brake pipe pressure for effecting an application of the brakes and having a chamber into which fluid under pressure is vented from the brake pipe in applying the brakes, a piston operated by fluid under pressure for assisting the release of the brakes, and a valve device operated by fluid under pressure supplied from said chamber for supplying fluid from said chamber to said piston.

8. In a fluid pressure brake, the combination with a brake pipe, of valve means operated upon a reduction in brake pipe pressure for applying the brakes and adapted in applying the brakes to vent fluid from the brake pipe to a chamber, and a piston operated by fluid under pressure supplied from said chamber for assisting the release of the brakes.

In testimony whereof I have hereunto set my hand.

MABLE M. THOMAS,
*Executrix of the Last Will and Testament of Thomas H. Thomas, Deceased.*